United States Patent
Takeda

[11] Patent Number: 5,918,818
[45] Date of Patent: Jul. 6, 1999

[54] ELECTROMAGNETICALLY ACTUATED INJECTION VALVE

[75] Inventor: Hideto Takeda, Kariya, Japan

[73] Assignee: Denso Corporation, Kariya, Japan

[21] Appl. No.: 08/861,062

[22] Filed: May 21, 1997

[30] Foreign Application Priority Data

May 22, 1996 [JP] Japan .................................. 8-127027
May 24, 1996 [JP] Japan .................................. 8-129691

[51] Int. Cl.⁶ .............................. B05B 1/30; F16K 31/02
[52] U.S. Cl. ................................ 239/585.1; 239/585.3; 239/585.4; 239/585.5; 251/129.15; 251/129.21
[58] Field of Search ...................... 239/5, 585.1, 585.3, 239/585.4, 585.5; 251/129.15, 129.21

[56] References Cited

U.S. PATENT DOCUMENTS

| | | | |
|---|---|---|---|
| 4,552,312 | 11/1985 | Ohno et al. | 239/585.4 |
| 4,903,898 | 2/1990 | Kind | 239/585.5 X |
| 4,909,439 | 3/1990 | Fu | 239/585.5 X |
| 5,016,821 | 5/1991 | Hans et al. | 239/585.4 |
| 5,098,016 | 3/1992 | Okamoto et al. | 239/585.1 X |
| 5,154,350 | 10/1992 | Ausiello et al. | 239/585.3 X |
| 5,188,297 | 2/1993 | Asano | 239/585.3 |
| 5,238,224 | 8/1993 | Horsting | 239/585.3 X |
| 5,255,855 | 10/1993 | Maier et al. . | |
| 5,348,233 | 9/1994 | Press et al. | 239/585.3 |
| 5,359,876 | 11/1994 | Maier et al. . | |
| 5,360,197 | 11/1994 | Reiter et al. | 239/585.4 X |
| 5,381,966 | 1/1995 | Gernert, II . | |
| 5,383,606 | 1/1995 | Stegmaier et al. | 239/585.1 X |
| 5,544,514 | 8/1996 | Maier et al. . | |
| 5,794,860 | 8/1998 | Neumann | 239/585.3 |

FOREIGN PATENT DOCUMENTS

| | | |
|---|---|---|
| 59-43959 | 9/1982 | Japan . |
| 61-66659 | 10/1984 | Japan . |
| 5-215039 | 11/1991 | Japan . |
| A-8-75030 | 9/1994 | Japan . |

*Primary Examiner*—Andres Kashnikow
*Assistant Examiner*—Robin O. Evans
*Attorney, Agent, or Firm*—Nixon & Vanderhye P.C.

[57] ABSTRACT

An injection valve with an injection hole includes a yoke, a fixed core surrounded by the yoke, a non-magnetic stopper between the yoke and the fixed core, a valve for opening and closing the injection hole, a movable core, whose axial movement is limited by the stopper, and an electromagnetic coil for attracting (when energized) the movable core to the fixed core. The movable core contacts the stopper and an air gap is formed between a surface of the movable core and at least one of the yoke and the fixed core. Since the movement of the movable core is limited by the stopper, the amount of movement by the movable core and the air gap formed between the surface of the movable core and at least one of the yoke and the fixed core are easily adjusted by adjusting the thickness of the stopper.

28 Claims, 4 Drawing Sheets

FIG. 5
FIG. 6
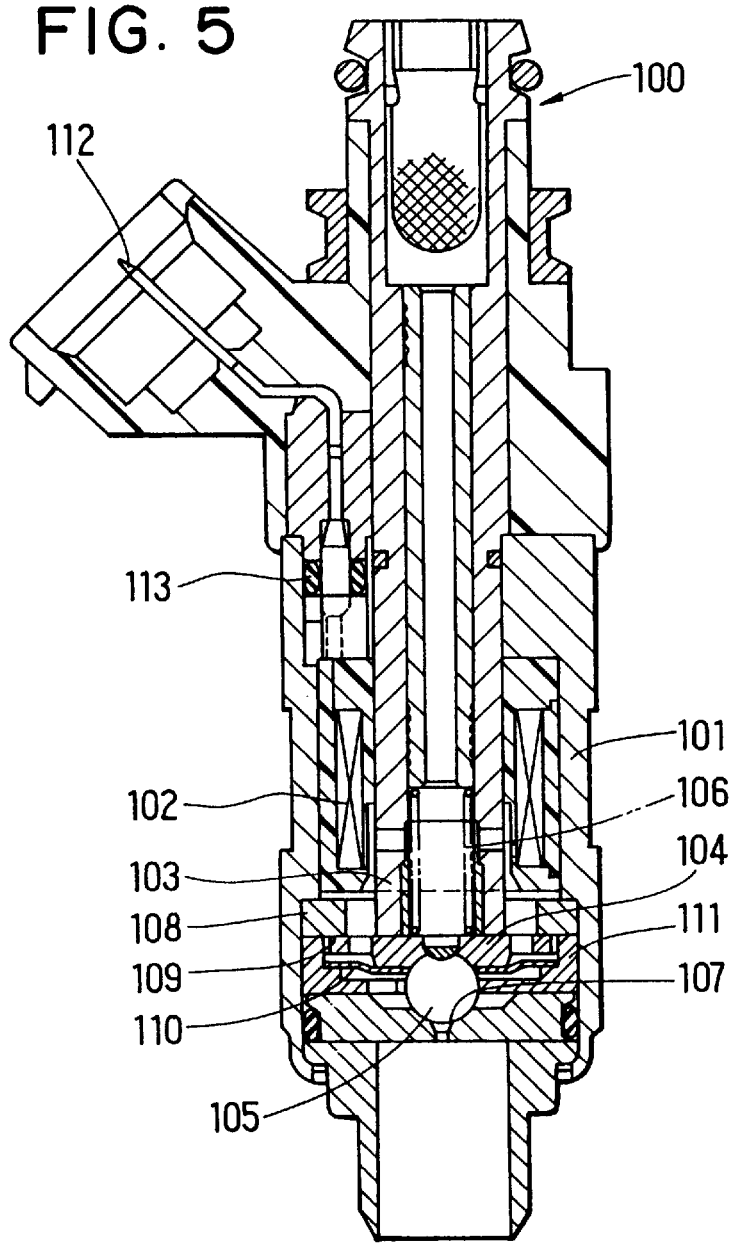
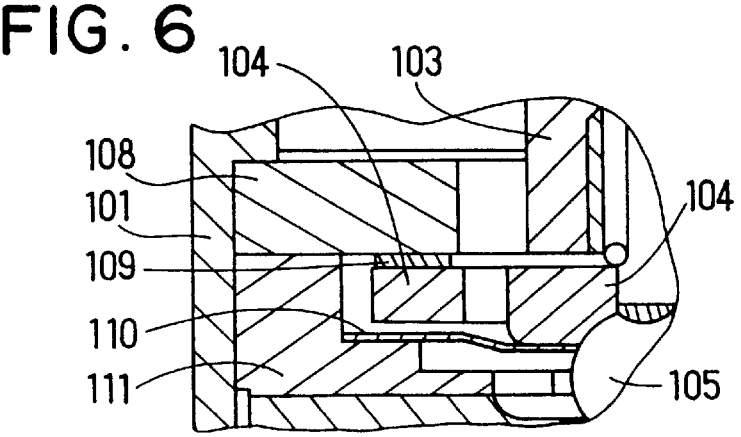

ELECTROMAGNETICALLY ACTUATED INJECTION VALVE

CROSS REFERENCE TO RELATED APPLICATIONS

This application is based upon and claims priority from Japanese Patent Application Nos. Hei 8-127027, filed May 22, 1996 and Hei 8-129691, filed May 24, 1996, the entire contents of which are hereby incorporated herein by reference.

BACKGROUND OF THE INVENTION

1. Field of the Invention

The present invention relates to an electromagnetically actuated injection valve.

2. Description of Related Art

One type of known injection valve has a fixed core and a movable core which faces the fixed core. With such an injection valve, a seat member on the movable core has increased area to interact with the fixed core thus achieving the same attraction power with fewer coil winding turns and a smaller diameter injection valve.

An example of such an injection valve is seen in JP-U-61-66659 wherein a magnetic circuit is formed by a yoke, a stopper, a fixed core and a movable core which are made of magnetically permeable material. The stroke of the movable core is limited by the stopper.

However, according to the injection valve disclosed in JP-U-61-66659, when remanent magnetization remains in the stopper, the opening and closing valve responses to opening and closing control signals are deteriorated.

Furthermore, since the stopper area intereacting with the movable core is large, in addition to increased remanent magnetization, so called "squeeze phenomenon" or "linking phenomenon", which connect two proximately located materials happen when the coil is energized. This "squeeze phenomenon" or "linking phenomenon" also acts to deteriorate the closing valve response.

Furthermore, such a seat member requires a flat spring to prevent fluctuation and/or deflection of the movable core when the movable core moves.

SUMMARY OF THE INVENTION

The present invention addresses such problems by providing an electromagnetically actuated injection valve which can be reduced in size without deteriorating opening and closing valve responses. The present invention can also prevent fluctuation of the movable core to achieve improved opening and closing valve responses.

The present invention may provide an injection valve having an injection hole and include: a yoke; a fixed core surrounded by the yoke; a non-magnetic stopper between the yoke and the fixed core; a valve for opening and closing the injection hole; a movable core, whose axial movement is limited by the stopper, being provided with the valve; and an electromagnetic coil. When energized, the coil attracts the movable core to the fixed core so that the movable core contacts the stopper and an air gap is formed between a surface of the movable core and at least one of the yoke and the fixed core. Since the movement of the movable core is limited by the stopper, its movement and the air gap between its surface and at least one of the yoke and the fixed core are easily adjusted by adjusting the thickness of the stopper.

The present invention can also use the stopper to prevent fuel from entering the electromagnetic coil. This permits the number of parts to be reduced because the stopper also functions as a seal to prevent fuel from entering the is electromagnetic coil.

The injection valve can include a protrusion, provided on at least one of the yoke and the fixed core, which protrudes toward the stopper in a radial direction. In this way, magnetic leakage between the yoke and the fixed core can be reduced because the radial distance between the yoke and the fixed core (other than the protrusion) can be kept relatively large while the radial size of the injection valve is reduced.

The injection valve may also include a flat portion on the movable core (which faces the fixed core in the axial direction) and a pipe portion (which is formed between the flat portion and the injection hole). The movable core can be slidably supported at outer peripheries of the flat portion and the pipe portion. Therefore, when the movable core moves in the axial direction, it moves smoothly without fluctuation and/or deflection because the sliding (guided) portions at the flat portion and the pipe portion are relatively distant from each other.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 5 is a cross sectional view of an injection valve according to a third embodiment of the present invention;

FIG. 6 is an enlarged cross sectional view of a portion of the injection valve according to the third embodiment of the present invention.

DETAILED DESCRIPTION OF EXEMPLARY EMBODIMENTS

Exemplary embodiments of the invention will be described hereinafter with reference to the drawings.

(First Exemplary Embodiment)

Figure 1:
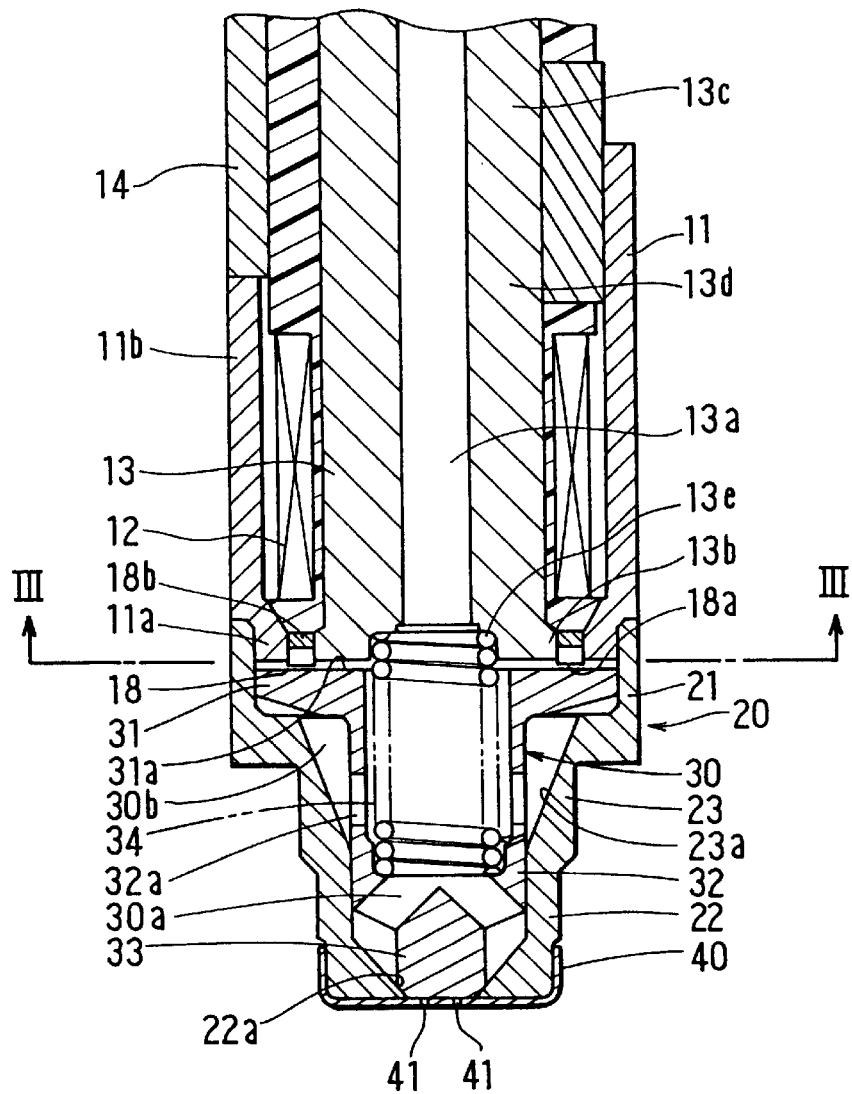
FIG. 1 is a cross sectional view of a portion of an injection valve according to a first embodiment of the present invention.
Figure 3:
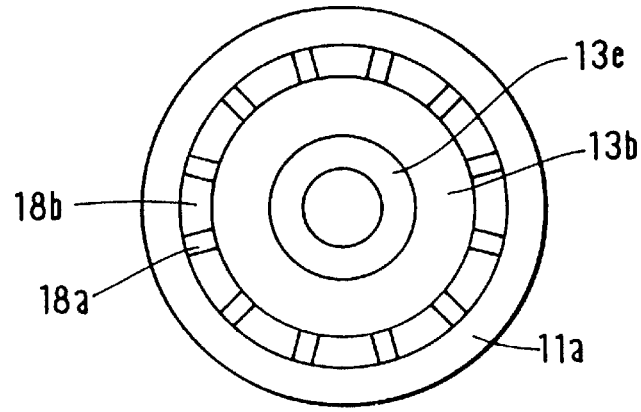
FIG. 3 is a cross sectional view of a portion taken along line III—III of FIG. 1 according to the first embodiment of the present invention.
Figure 2:
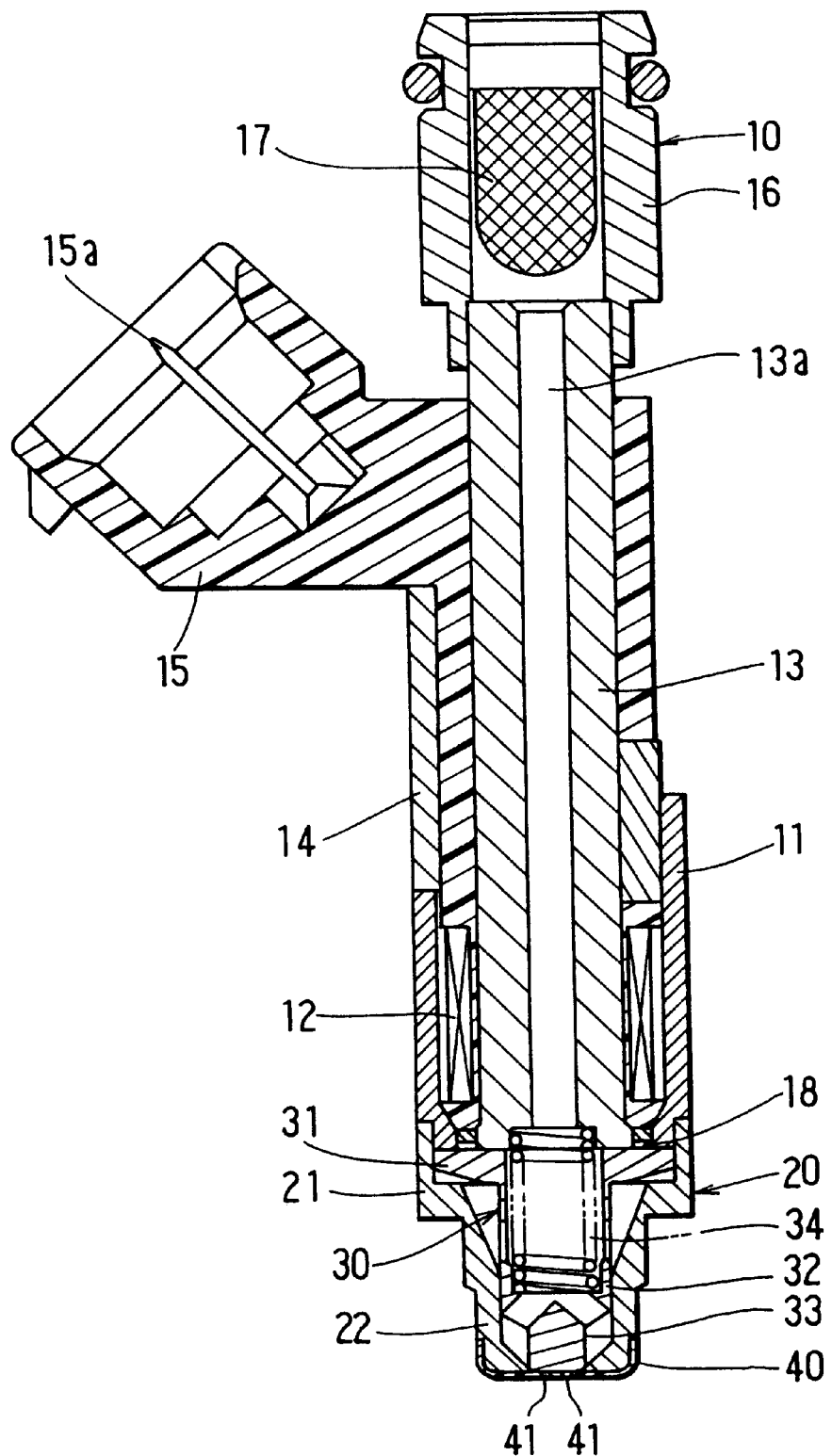
FIG. 2 is a cross sectional view of the injection valve according to the first embodiment of the present invention.

A first exemplary embodiment of the invention is shown in FIGS. 1–3.

As shown in FIG. 2, coil 12 is placed at an inside periphery of yoke 11 of fuel injection valve 10. Fixed core 13 is fixed at the inside of coil 12. Yoke 11 and fixed core 13 are made of magnetically permeable (e.g., ferromagnetic) material. The top portion of fixed core 13 is covered by a resin (non-conductive) housing 15 and a cover 14. Resin housing 15 also covers terminal 15a which is electrically connected to coil 12. Fuel intake pipe 16, which has filter 17 inside, is attached to the upper end (opposite injection hole 41) of fixed core 13.

Fuel, which flows into intake pipe 16, is cleaned by filter 17 and flows into fuel passage 13a which is formed at the inside of fixed core 13. Valve body 20, which guides movable core 30, is welded to the lower end (at the side of injection hole 41) of yoke 11. Movable core 30, which is located in valve body 20, is faces yoke 11 and fixed core 13 in an axial direction.

As shown in FIG. 1, protrusion 11a, which protrudes toward stopper 18 in the radial direction, is formed on yoke 11 at its lower edge. Yoke 11 also has large radial portion 11b which has a larger radius than that of protrusion 11a.

Protrusion 13b, which protrudes toward stopper 18 in the radial direction, is formed on fixed core 13 at its lower edge. Fixed core 13 also has small radial portion 13c which has a smaller radius than that of protrusion 13b. Since the cross sectional area of small radial portion 13c is larger than that of protrusion 13b, saturation of magnetic flux, which deteriorates the magnetic attraction force, at high-magnetic flux density portion 13d of fixed core 13 is prevented. Coil 12 is fixed between large radial portion 11b and small radial portion 13c.

Ring-shaped stopper 18 is sandwiched between the inner periphery of protrusion 11a and the outer periphery of protrusion 13b. As shown in FIG. 3, convex portion 18a and concave portion 18b are alternately formed in a radial direction. The surface of convex portion 18a is placed lower (toward movable core 30) than lower edges of yoke 11 and fixed core 13. Stopper 18 not only limits the maximum lifted position of movable core 30 by stopping flat portion 31 when movable core 30 is lifted, but also prevents fuel, which flows into fuel passage 30a from fuel passage 13a, from entering coil 12. Stopper 18 may be made of non-magnetic metal or rubber material which has sufficient endurance against fuel.

Valve body 20, which is made of non-magnetic material, is integrally formed with large radial portion 21, small radial portion 22 (which has smaller inner radius than that of large radial portion 21), and tapered portion 23. Tapered portion 23 has tapered inner wall 23a. Space 30b is formed by tapered inner wall 23a and pipe portion 32 of movable core 30. Valve seat 22a is formed at small radial portion 22.

Yoke 11 and large radial portion 21 have approximately the same outer diameters (as shown in the drawings) and are welded together. Cup 40 which has injection hole 41 is fixed by welding to the lower end of valve body 20.

Movable core 30 is integrally formed with flat portion 31, pipe portion 32 and valve portion 33. Flat portion 31 has flat surface 31a which faces yoke 11, fixed core 13 and stopper 18 in the axial direction. The gap between flat surface 31a and the lower surface of yoke 11 is equal to the gap between flat surface 31a and the lower surface of fixed core 13.

Movable core 30 has fuel passage 30a. Fuel flows through filter 17, fuel passage 13a, fuel passage 30a and injection hole 41 respectively. Fuel passage 30a and injection hole 41 are disconnected when valve portion 33 contacts valve seat 22a.

The lower end of spring 34 is supported by the inner wall of movable core 30. The upper higher end of spring 34 is supported by a concave portion 13e which is formed on protrusion 13b. Since spring 34 is supported by concave portion 13e formed on protrusion 13b, it is possible to reduce the radius of small radial portion 13c without reducing its end area which faces movable core 30. Movable core 30 is biased toward valve seat 22a by the force of spring 34.

The outer wall of flat portion 31 is slidably guided in the axial direction by an inner wall of large radial portion 21 of valve body 20. The outer wall of pipe portion 32 is slidably guided in the axial direction by an inner wall of small radial portion 22 of valve body 20. The sliding (guided) portion of pipe portion 32 is located closer to injection hole 41 than the axial center of movable core 30. Connection passage 32a formed on pipe portion 32 connects fuel passage 30a to space 30b.

When coil 12 is not energized, valve 33 of movable core 30 is biased by spring 34 into contact with valve seat 22a and fuel (guided through filter 17, fuel passage 13a and fuel passage 30a) is prevented from passing through injection hole 41.

When coil 12 is energized, movable core 30 is attracted by magnetic force toward fixed core 13 against the force of spring 34. Flat portion 31 is stopped against the convex portions 18a of stopper 18 while coil 12 is energized. Fuel is therefore injected from injection hole 41 because valve 33 is now detached from valve seat 22a.

When coil 12 is de-energized, movable core 30 is again spring biased to valve seat 22a and flat portion 31 is now removed from contact with convex portion 18a. Movable core 30 is easily moved away from stopper 18 when coil 12 is de-energized because the actual contact area between stopper 18 and movable core 30 is reduced by concave portions 18b. Therefore, the closing valve response of fuel injection valve 10 is improved. When valve 33 again contacts valve seat 22a, injection hole 41 is closed and fuel injection ends.

When movable core 30 moves in the axial direction, it moves smoothly without fluctuation and/or deflection because the sliding (guided) flat portion 31 and pipe portion 32 are relatively distant from each other (e.g., at opposite ends of movable core 30). Furthermore, because this antideflection arrangement keeps the distance (gap) between yoke 11/fixed core 13 and flat portion 31 uniform at any radial point, the fluctuation of magnetic attraction exerted on movable core 30 is reduced when coil 12 is energized. The smooth movement of movable care 30 and the improved uniformity of magnetic attraction force can achieve more accurate control of movable core 30.

According to the first exemplary embodiment of the invention, the movement of movable core 30 is limited by stopper 18. Therefore, the amount of movement by movable core 30 and the resulting gap between yoke 11/fixed core 13 and flat portion 31 are easily adjusted by adjusting the height of convex portions 18a. Furthermore, the number of parts can be reduced because stopper 18 also functions as a seal to prevent fuel from entering coil 12. The radial size of fuel injection valve 10 can be reduced because the radius of fixed core 13 (other than protrusion 13b) is reduced. Magnetic leakage between yoke 11 and fixed core 13 can be reduced because the radial distance between yoke 11 and fixed core 13 (other than protrusions 11a and 13b) can be kept large while the radial size of fuel injection valve 10 is reduced. In other words, the inductance of coil 12 (ratio of all produced magnetic flux to magnetomotive force) can be reduced. Therefore, opening and closing valve responses to opening and closing control signals to coil 12 are improved. Furthermore, the number of turns of coil 12 can be increased because the radial distance between yoke 11 and fixed core 13 can be increased. Therefore, sufficient magnetic force to attract movable core 30 can be produced even if the radial size of fuel injection valve 10 is reduced. Furthermore, movable core 30 can move smoothly because fuel between pipe portion 32 and tapered portion 23 can be released to fuel passage 30a through connection passage 32a.

(Second Exemplary Embodiment)

Figure 4:
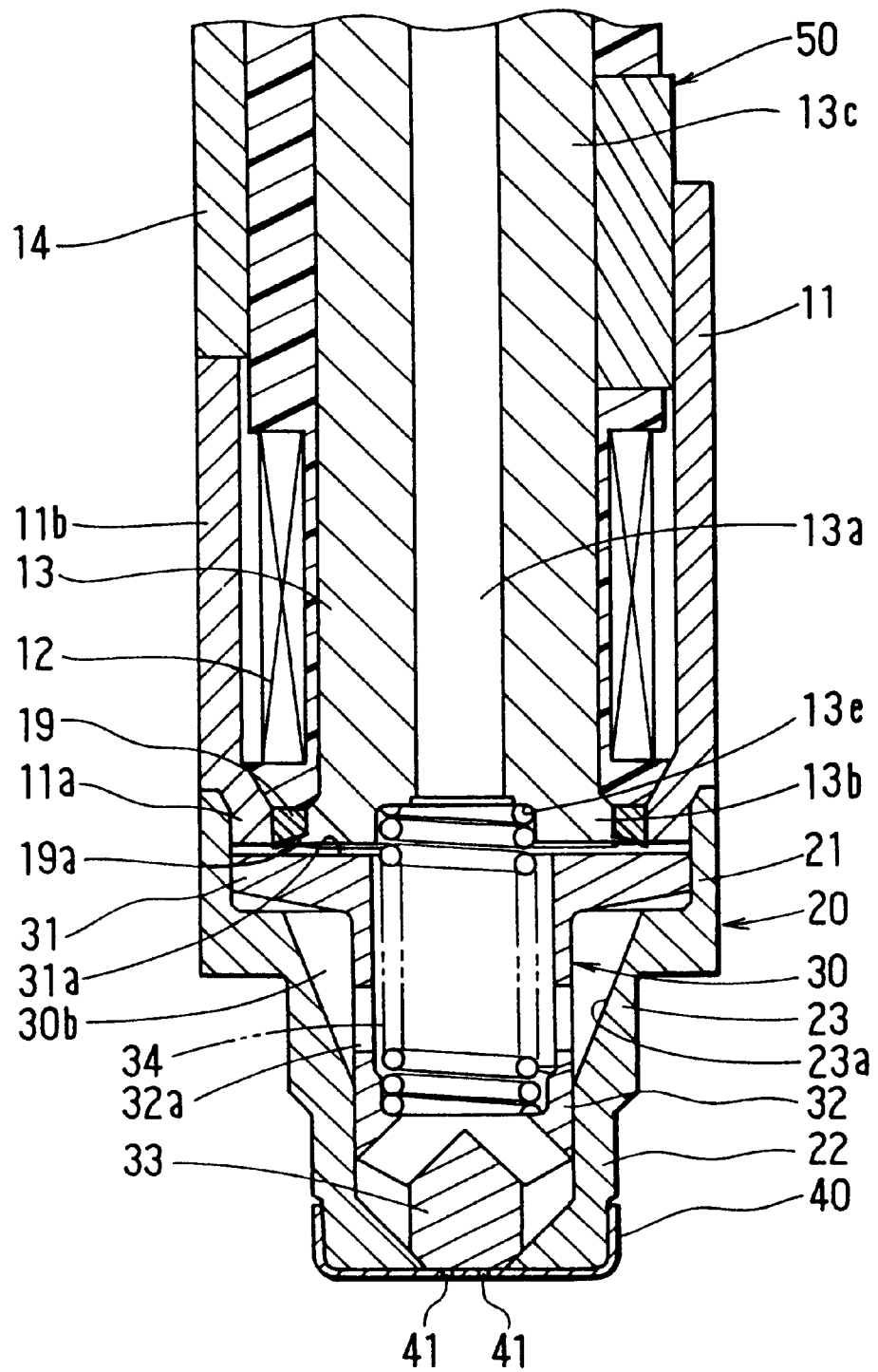
FIG. 4 is a cross sectional view of a portion of an injection valve according to a second embodiment of the present invention.

A second exemplary embodiment of the invention is shown in FIG. 4. In this embodiment, components which are substantially the same as those in the first embodiment are assigned the same or similar reference numerals and their otherwise repeated explanations are omitted hereinafter.

Ring-shaped stopper 19 has tapered surface 19a which faces flat surface 31a. Tapered surface 19a is tapered from outside to inside in the radial direction in such a manner that the outer edge of tapered surface 19a is closer to flat surface 31a than the inner edge of tapered surface 19a.

When coil 12 is energized, movable core 30 is attracted (lifted) toward fixed core 13 until flat portion 31 contacts stopper 19 only at the outer (i.e., lowest) edge of tapered surface 19a. Since the contacting area between stopper 19 and movable core 30 is quite again small, movable core 30 is easily moved away from stopper 19 when coil 12 is de-energized. Therefore, the closing valve response is improved.

In the first and second exemplary embodiments of the invention, flat surface 31a is flat. However, it is possible, in the alternative, to modify flat surface 31a in such a manner that it has a raised step portion as long as a gap is formed between movable core 30 and at least yoke 11 or fixed core 13 when movable core 30 contacts stopper 18 or 19. In that case, a gap between movable core 30 and yoke 11 can be different from the gap between movable core 30 and fixed core 13.

It is possible, in the alternative, to arrange yoke 11 in such a manner that it covers the outer periphery of the movable core and only the fixed core 13 faces the movable core 30. It is also possible to arrange yoke 11 such that a part of the yoke and the fixed core face the movable core.

It is possible, in the alternative, to omit one of protrusions 11a or 13b.

It is possible, in the alternative, to form valve portion 33 separately from movable core 30.

It is possible, in the alternative, to separate valve body 20 into a guide made of non-magnetic material which slidably guides flat portion 31 and a valve body which has the valve seat. In this case, such valve body can be made of magnetic (i.e., ferromagnetic) material.

(Third Exemplary Embodiment)

A third exemplary embodiment of the invention is shown in FIGS. 5 and 6.

Coil 102 is placed in yoke 101 which functions as a housing for fuel injection valve 100. Fixed core 103 is placed in coil 102. Movable core 104, which has a plate shape, is placed so that it faces fixed core 103 maintaining a certain gap therebetween.

Ball valve 105 and movable core 104 are biased toward valve seat 107 by the force of spring 106.

When coil 102 is energized, movable core 104 is attracted (lifted) upward against the force of spring 106 and fuel is injected because ball valve 105 is detached from valve seat 107.

Spacer 109, which is a thin film made of non-magnetic material and has a thickness of 50 $\mu$m, is attached to stopper 108 at the side which faces movable care 104. When coil 12 is energized and movable core 104 is attracted toward fixed core 103, movable core 104 contacts spacer 109 and is limited in its maximum lift position. Then, a certain gap is formed between fixed core 103 and movable core 104 while movable core 104 contacts spacer 109.

Flat spring 110 is provided at the injection side of movable core 104 to prevent fluctuation or deflection of movable core 104.

Guide portion 111, which is made of non-magnetic material, not only guides ball valve 105 but also prevents magnetic flux from leaking between outer periphery of movable core 104 and yoke 101 by covering the outer periphery of movable core 104.

An O-ring seal 113 is provided between coil 102 and terminal 112.

According to the third exemplary embodiment of the invention, movement of movable core 104 is limited by stopper 108. Therefore, the amount of movement by movable core 104 and the gap formed between yoke 101/fixed core 103 and movable core 104 are easily adjusted by adjusting the thickness of spacer 109.

Although the present invention has been described in connection with only a few exemplary embodiments, it is to be noted that various changes and modifications will be apparent to those skilled in the art. Such changes and modifications are to be included within the scope of the invention as defined in the appended claims.

What is claimed is:

1. An electromagnetically actuated fuel injection valve comprising:

a yoke;

a fixed core surrounded by said yoke;

a stopper disposed between said yoke and said fixed core, said stopper being made of non-magnetic material;

a valve located to open and close a fuel injection hole;

a movable core having a surface facing said yoke and said fixed core in an axial direction, and having a flat portion which faces said fixed core in said axial direction, and having a pipe portion which is formed between said flat portion and said injection hole, said movable core being coupled to said valve so that when said movable core moves in said axial direction its movement is limited by contacting said stopper; and an electromagnetic coil disposed to attract, when energized, said movable core toward said fixed core so that said movable core contacts said stopper and an air gap is formed between a surface of said movable core and at least one of said yoke and said fixed core, wherein;

said movable core is slidably supported at outer peripheries of said flat portion and said pipe portion by a non-magnetic valve body having a valve seat which contacts said valve when said valve closes said injection hole.

2. An electromagnetically actuated fuel injection valve as in claim 1 wherein:

said surface of said movable core faces said yoke, said fixed core and said stopper in said axial direction;

said surface of said movable core is flat; and said air gap between said surface and said yoke is equal to said air gap between said surface and said fixed core.

3. An electromagnetically actuated fuel injection valve as in claim 1 wherein:

said injection valve further includes a valve body having a valve seat which contacts said valve when said valve closes said injection hole and a non-magnetic guide which extends from said valve body toward said yoke; and said movable core is slidably supported at said outer periphery of said flat portion by said guide.

4. An electromagnetically actuated fuel injection valve as in claim 1 wherein:

said guide has approximately the same outer diameter as one of said yokes.

5. An electromagnetically actuated fuel injection valve as in claim 1 wherein:

at least one of said yoke and said fixed core further includes a protrusion which protrudes toward said stopper in a radial direction.

6. An electromagnetically actuated fuel injection valve as in claim 1 wherein:

said stopper further includes a tapered portion on a surface which partially contacts said movable core.

7. An electromagnetically actuated fuel injection valve comprising:
   a yoke;
   a fixed core surrounded by said yoke;
   a stopper disposed between said yoke and said fixed core, said stopper being made of non-magnetic material;
   a valve located to open and close a fuel injection hole;
   a movable core having a surface facing said yoke and said fixed core in an axial direction, and having a flat portion which faces said fixed core in said axial direction, and having a pipe portion which is formed between said flat portion and said injection hole, said movable core being coupled to said valve so that when said movable core moves in said axial direction its movement is limited by contacting said stopper; and
   an electromagnetic coil disposed to attract, when energized, said movable core toward said fixed core so that said movable core contacts said stopper and an air gap is formed between a surface of said movable corer and at least one of said yoke and said fixed core, wherein:
   said movable core is slidably supported at outer peripheries of said flat portion and said pipe portion by a non-magnetic valve body having a valve seat which contacts said valve when said valve closes said injection hole; and
   wherein said stopper further includes at least one concave portion on a surface which otherwise contacts said movable core.

8. An electromagnetically actuated fuel injection valve comprising:
   an electromagnet disposed to attract a relatively movable spring-biased ferromagnetic injection valve member when energized; and
   a stop member made of non-ferromagnetic material and disposed between said electromagnet and said valve member to limit its movement toward the electromagnet and thus improve valve responsiveness upon de-energization of the electromagnet, wherein
   said stop member is shaped and disposed to maintain a gap between said electromagnet and said valve member thus further improving valve responsiveness upon de-energization of the electromagnet;
   said stop member comprises an annular ring-shaped member having a sequence of differing axial dimensions therearound; and
   said differing axial dimensions comprise concave and convex portions on at least one end-side of the stop member, said convex-shaped portions acting to contact and stop further movement of the valve member toward the electromagnet.

9. An electromagnetically actuated fuel injection valve as in claim 8 wherein:
   said stop member also provides a seal against fuel passage into an electromagnet coil structure.

10. An electromagnetically actuated fuel injection valve as in claim 8 wherein:
   said stop member comprises an annular ring-shaped member having a sequence of differing axial dimensions therearound.

11. An electromagnetically actuated fuel injection valve as in claim 10 wherein:
   said differing axial dimensions comprise concave and convex portions on at least one end-side of the stop member, said convex-shaped portions acting to contact and stop further movement of the valve member toward the electromagnet.

12. An electromagnetically actuated fuel injection valve as in claim 8 wherein:
   said electromagnet includes inner and outer ferromagnetic annular structures enclosing a coil therewithin; and
   at least one of said inner and outer annular enclosing structures having an annular projection extending radially toward the other structure at one end of the electromagnet, said stop member being disposed within a thus narrowed annular space leading to the coil.

13. An electromagnetically actuated fuel injection valve and in claim 8 wherein:
   said stop member is formed as a cylindrical annulus having a tapered end surface facing at an oblique angle with respect to its axis.

14. An electromagnetically actuated fuel injection valve as in claim 8 wherein:
   said electromagnet includes a cylindrical structure having an end face of a predetermined diameter;
   said valve member includes a large diameter end axially faced toward said end face of the electromagnet and having an approximately equal diameter;
   said valve member having a small diameter end, opposite said large diameter end, axially faced toward a fuel injection outlet port; and
   said valve member being slidingly guided for axial movement only proximate said large diameter end and said small diameter end.

15. An electromagnetically actuated fuel injection valve as in claim 8 wherein:
   said valve member is slidingly guided at spaced-apart opposite ends of the valve member for axial movement in response to energization and de-energization of the electromagnet.

16. An electromagnetically actuated fuel injection valve comprising:
   an electromagnet disposed to attract a relatively movable spring-biased ferromagnetic injection valve member when energized; and
   a stop member made of non-ferromagnetic material and disposed between said electromagnet and said valve member to limit its movement toward the electromagnet and thus improve valve responsiveness upon de-energization of the electromagnet, wherein:
   said stop member is shaped and disposed to maintain a gap between said electromagnet and said valve member thus further improving valve responsiveness upon de-energization of the electromagnet; and
   said stop member is formed as a cylindrical annulus having a tapered end surface facing at an oblique angle with respect to its axis.

17. An electromagnetically actuated fuel injection valve as in claim 16 wherein:
   a surface of said valve member facing a fixed surface of said electromagnet and said stopper in said axial direction.

18. An electromagnetically actuated fuel injection valve as in claim 17 wherein:
   said surface of said valve member is flat.

19. An electromagnetically actuated fuel injection valve as in claim 18 wherein:
   said gap is located between said surface of the valve member and said fixed surface.

20. An electromagnetically actuated fuel injection valve as in claim 16 wherein:

at least one of said electromagnet and valve member further includes a protrusion which protrudes toward said stopper in a radial direction.

21. An electromagnetically actuated fuel injection valve as in claim 16 wherein:

said valve member further includes a flat portion which faces a flat surface of said electromagnet in said axial direction and a pipe portion which is formed between said flat portion and said injection hole; and said valve member is slidably supported at outer peripheries of said flat portion and said pipe portion.

22. An electromagnetically actuated fuel injection valve as in claim 21 wherein:

said valve member is slidably supported at said outer periphery of said flat portion by a non-magnetic valve body having a valve seat which contacts said valve when said valve closes an injection hole.

23. An electromagnetically actuated fuel injection valve as in claim 21 wherein:

said injection valve further includes a valve body having a valve seat which contacts said valve when said valve closes an injection hole and a non-magnetic guide which extends from said valve body toward said electromagnet; and said valve member is slidably supported at said outer periphery of said flat portion by said guide.

24. An electromagnetically actuated fuel injection valve as in claim 23 wherein:

said guide has approximately the same outer diameter as said electromagnet.

25. An electromagnetically actuated fuel injection valve as in claim 16 wherein:

said valve member is slidingly guided at spaced-apart opposite ends of the valve member for axial movement in response to energization and de-energization of the electromagnet.

26. An electromagnetically actuated fuel injection valve as in claim 16 wherein:

said stop member comprises an annular ring-shaped member having a sequence of differing axial dimensions therearound.

27. An electromagnetically actuated fuel injection valve as in claim 16 wherein:

said electromagnet includes inner and outer ferromagnetic annular structures enclosing a coil therewithin; and at least one of said inner and outer annular enclosing structures having an annular projection extending radially toward the other structure at one end of the electromagnet, said stop member being disposed within a thus narrowed annular space leading to the coil.

28. An electromagnetically actuated fuel injection valve as in claim 16 wherein:

said electromagnet includes a cylindrical structure having an end face of a predetermined diameter;

said valve member includes a large diameter end axially faxed toward said end face of the electromagnet and having an approximately equal diameter;

said valve member having a small diameter end, opposite said large diameter end, axially faced toward a fuel injection outlet port; and said valve member being slidingly guided for axial movement only proximate said large diameter end and said small diameter end.

* * * * *